United States Patent
Kraemer

(10) Patent No.: US 7,707,569 B2
(45) Date of Patent: Apr. 27, 2010

(54) METHOD AND APPARATUS FOR CUSTOMIZING MODEL TO CODE TRANSFORMATIONS

(75) Inventor: Henrich J. Kraemer, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 1142 days.

(21) Appl. No.: 11/170,586

(22) Filed: Jun. 29, 2005

(65) Prior Publication Data

US 2007/0006135 A1    Jan. 4, 2007

(51) Int. Cl.
*G06F 9/44* (2006.01)
*G06F 9/45* (2006.01)

(52) U.S. Cl. .................. 717/159; 717/128; 717/129; 717/130; 717/154

(58) Field of Classification Search .............. None
See application file for complete search history.

(56) References Cited

U.S. PATENT DOCUMENTS

| 6,775,680 B2* | 8/2004 | Ehrman et al. ............... 707/102 |
| 2003/0018661 A1 | 1/2003 | Darugar |
| 2004/0015515 A1* | 1/2004 | Beisiegel et al. ......... 707/103 Y |

\* cited by examiner

*Primary Examiner*—Chuck O Kendall
(74) *Attorney, Agent, or Firm*—Hamilton, Brook, Smith & Reynolds, P.C.

(57) ABSTRACT

A method and system customize and thus extend a fixed mapping between a computer program code language and a code-model notation. Given a fixed mapping, the invention method and system define customization points in the mapping based on known/predefined relatively over rigid points. For each customization point, there is a respective mapping key that enables a piece of the computer program code to be derived from a corresponding piece of the code-model, and vice versa. The code-model reflects the customizable perspective, and contents of the code-model can be tailored to elide implementation details.

18 Claims, 4 Drawing Sheets

METHOD AND APPARATUS FOR CUSTOMIZING MODEL TO CODE TRANSFORMATIONS

BACKGROUND OF THE INVENTION

Different notations are used to describe systems from particular perspectives. To describe software systems, modeling languages such as UML, programming languages themselves such as C++, or even machine code are a few examples of notations used frequently.

Notations at a similar abstraction level often carry a great portion of overlapping information. For example, source code can also be represented as a UML model. Similarly, representing the same system, a general platform-independent model (PIM) and a model which specifically targets a particular platform would also have a large overlap.

Even for overlapping notations, each of them captures unique aspects of the system. Therefore using both is desirable. This results in a burden, to maintain the consistency and integrity of the overlapping descriptions. Such maintenance can be automated, if a formal bi-directional transformation exists between the overlapping parts of the two notations. An automatic transformation can "transfer" changes from a description in one notation into the other. A formal bi-directional transformation is called a "mapping" in the following description.

In OMG MDA the term "mark" is used to select a transformation to be applied. However, no particular mechanism to specify the transformations themselves is suggested. There are also general-purpose techniques such as XSLT to describe transformations between XML documents. These techniques are targeted to programmers not end users. In addition most methods don't address creating mappings; they are only concerned with one-directional transformations.

Mappings which are predefined such that users cannot change them are called "fixed" in the following. Fixed mappings are commonplace. For example, the JSR-026 standard specifies a fixed mapping between UML models and java code. A fixed mapping has the benefit that it is comparatively easily supported by software tools. Fixed mappings however have severe non-obvious weaknesses:

I. Their arbitrary mapping choices are either too simplistic or too complex.
II. They tend to not use existing information to derive content.
III. They tend to disconnect the mapped content.
IV. They result in a fixed perspective.

These weaknesses are best explained using examples.

In UML two classes can be related via an AssociationEnd. The quality of this relationship is captured with properties such as Kind (Aggregation, Composition or Simple), its Ordering (Unordered, Ordered) and Multiplicity. There are many different ways how two classes related by an AssociationEnd can be mapped to code. A fixed mapping will have to arbitrarily select a particular bidirectional transformation.

With respect to I and II above, the JSR-026 introduces additional tags such as JavaCollection and JavaDimension. These tags are used instead of the already defined AssociationEnd's properties. If the JavaCollection's tagged value is set it defines the Type used to implement the AssociationEnd in code. JavaDimension is used to augment the type found in the AssociationEnd's TypeExpression with Java array brackets. Both replace the existing properties TypeExpression, Multiplicity and more.

A better mapping uses model information when deriving code. However this burdens every user with the complexity to understand the transformation even if they don't benefit from the additional complexity. This is probably the reason why most fixed mappings stop using relevant modeled information in favor of relying on introducing tagged values at some point.

This conflict is emphasized in complex mapping situations that don't naturally have a bi-directional transformation which users would universally accept as natural. For example consider possible mapping of an AssociationEnd to the C++ code "mylist<Foo*, N, HeapAllocator>".

With respect to III above, the JSR mapping uses a default transformation if neither JavaDimension nor JavaCollection are set. This default transformation generates the code based on the AssociationEnd's Supplier. The code will change as the Supplier is changed. However once JavaCollection is set the AssociationEnd's Supplier is not considered. The code becomes disconnected from the native UML properties of the AssociationEnd. This is highly undesirable and has a side-effect of not deriving the code from existing UML properties. This issue is impossible to resolve with a fixed mapping when there is no universally agreed upon mapping without becoming highly complex.

With respect to IV above, using a fixed mapping results in a fixed perspective. For example consider the model when mapping the C++ code "mylist<Foo*, N, HeapAllocator>Foos;. A fixed mapping will result in a model capturing mylist, Foo, N, HeapAllocator somewhere with the AssociationEnd. Therefore the AssociationEnd will be unable to capture the code in UML spirit using the UML properties (Multiplicity, Ordering, Supplier, etc.) as much as possible.

SUMMARY OF THE INVENTION

Despite their weaknesses, fixed mappings have their place and are suitable in areas where the mapped meta-models are either sufficiently similar or can be fully derived in both directions in a universally acceptable way. Fixed mappings are usually fine for large portions of the mapping. What is lacking is the capability to customize the mapping such that the weaknesses of a rigid mapping can be overcome at points where the prerequisites for a fixed mapping are not met.

The present invention is a system and method to customize (and hence extend) a fixed mapping between code and a code-model. This results in a customizable perspective that the code-model (perspective) reflects. This allows tailoring the content of the code-model for example to elide implementation details. In addition it allows avoiding the weaknesses of fixed mappings.

In a preferred embodiment, the invention method and system customizes and/or extends a fixed mapping between a computer program code language and a code-model notation by:

(1) given a fixed mapping between (a) a computer program code expressed in a certain programming language and (b) a code-model expressed in a modeling language, identifying, determining, defining or otherwise obtaining customization points in the mapping;

(2) using the defined customization points dividing into, partitioning into or otherwise forming from the mapping a set of distinct mapping portions; and (3) for each mapping portion, providing a respective mapping key that enables at least one of (i) a piece of the computer program code in the mapping portion to be derived from a corresponding piece of the code model, and (ii) a piece of the code model in the mapping portion to be derived from corresponding program code.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention method extends a fixed mapping to allow for customization at predefinable points and in particular at points determined to require a larger degree of freedom in the mapping. The invention introduces a novel scheme to specify mapping customization which supports specifying bi-directional transformations and which can be defined and applied by users as opposed to programmers.

The mapping customizations are manifested as assets with their own lifecycle. In the following description, each customization is referred to as mapping key. A mapping key provides the information to derive a piece of code from a corresponding piece of the code-model. The same mapping key is also used to specify the reverse transformation.

Figure 1:
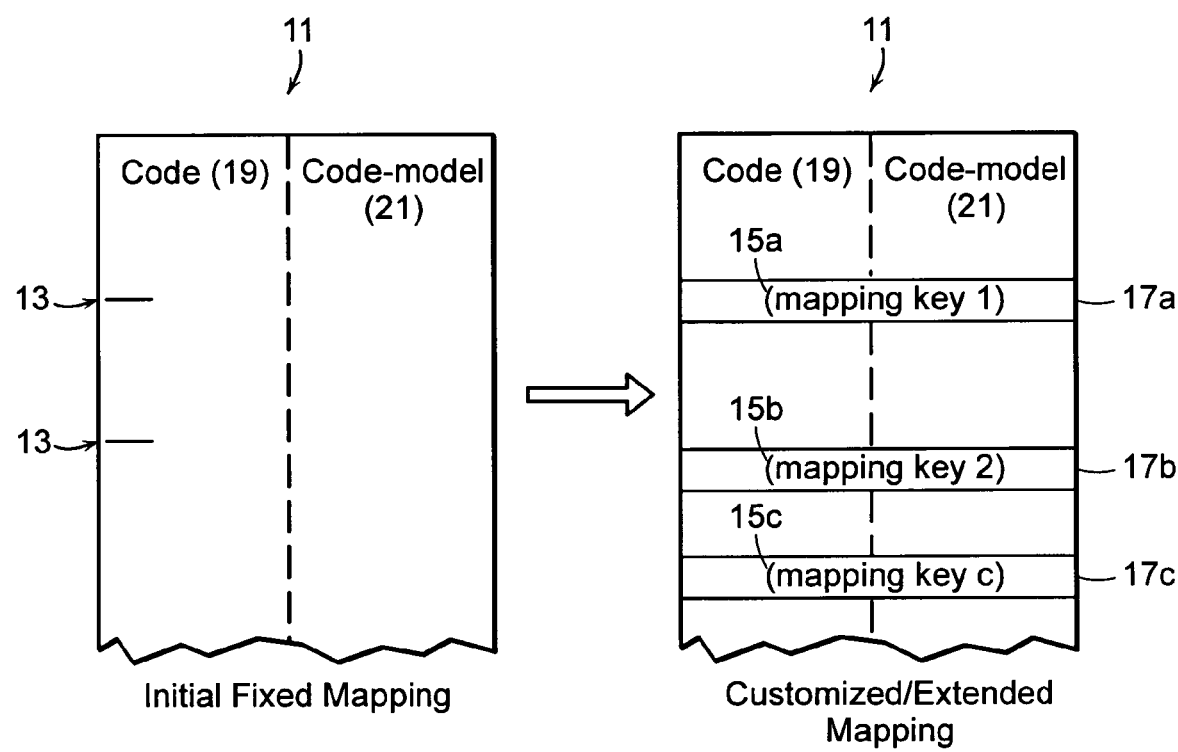
FIG. 1 is a schematic view of the present invention.

Illustrated in FIG. 1 is a fixed mapping 11 between a computer program code language 19 and code model notation 21. The computer program code 19 is, for example, expressed in a certain programming language of any of the known existing programming languages. The code model 21 is expressed in a modeling language for example. In the fixed mapping 11, there are predefinable points 13 which require a larger degree of freedom in the mapping (i.e., contention points). Restated, these points 13 have the effect of being too rigid at times and thus are desirous customization points 13 in the fixed mapping 11.

For each of the customization points 13 there can be a respective mapping key with user defined content. A mapping key 15 has the effect of forming from the mapping 11 a (small) set of distinct cases for each of which a single simple formula or a few simple formulas describes the resulting mapping portion 17. Once a mapping key 15 is associated with a code-model 21 of its respective mapping portion 17, the methods of the mapping key 15 describe how the corresponding code 19 can be derived. As such, the mapping key 15 overrides the default (prior existing) derivation between code-model 21 and corresponding program code 19.

Mapping keys 15 employ formulas. These formulas represent patterns that can be identified in code 19. A matching formula identifies the reverse transformation from code 19 to model 21.

A well defined mapping key 15 describes the mapping over the full set of applicable cases of the associated code 19 and code-model 21 pieces of the respective mapping portion 17. Assuming a particular mapping key 15 applies for a piece of code-model 21, changing any of its relevant properties will result in corresponding code 19 changes in a way defined as meaningful when the mapping key 15 was created.

Thus, the invention provides a novel, flexible but simple scheme to customize mappings 11. The scheme assumes that there is a predefined mapping 11 in place, for example, in a modeling tool supporting transformation to/from code and textual artifacts. The software implementing such a predefined mapping 11 is customized at strategic extension-points 13 by the present invention. A particular customizable mapping will have a finite—potentially open ended—set of customization points 13.

Each customization point 13 provides a way to establish a bi-directional transformation manifesting itself in a mapping key 15.

How a particular mapping key 15 is tied to a mapping portion or respective model piece 21 is not the subject of this invention. There are many possibilities including marking a specific model element, associating a list of keys 15 with a particular area of interest such as an IDE project, or playing through scenarios by looking at what effect the application of this set of mapping keys 15 would have.

Figure 2:
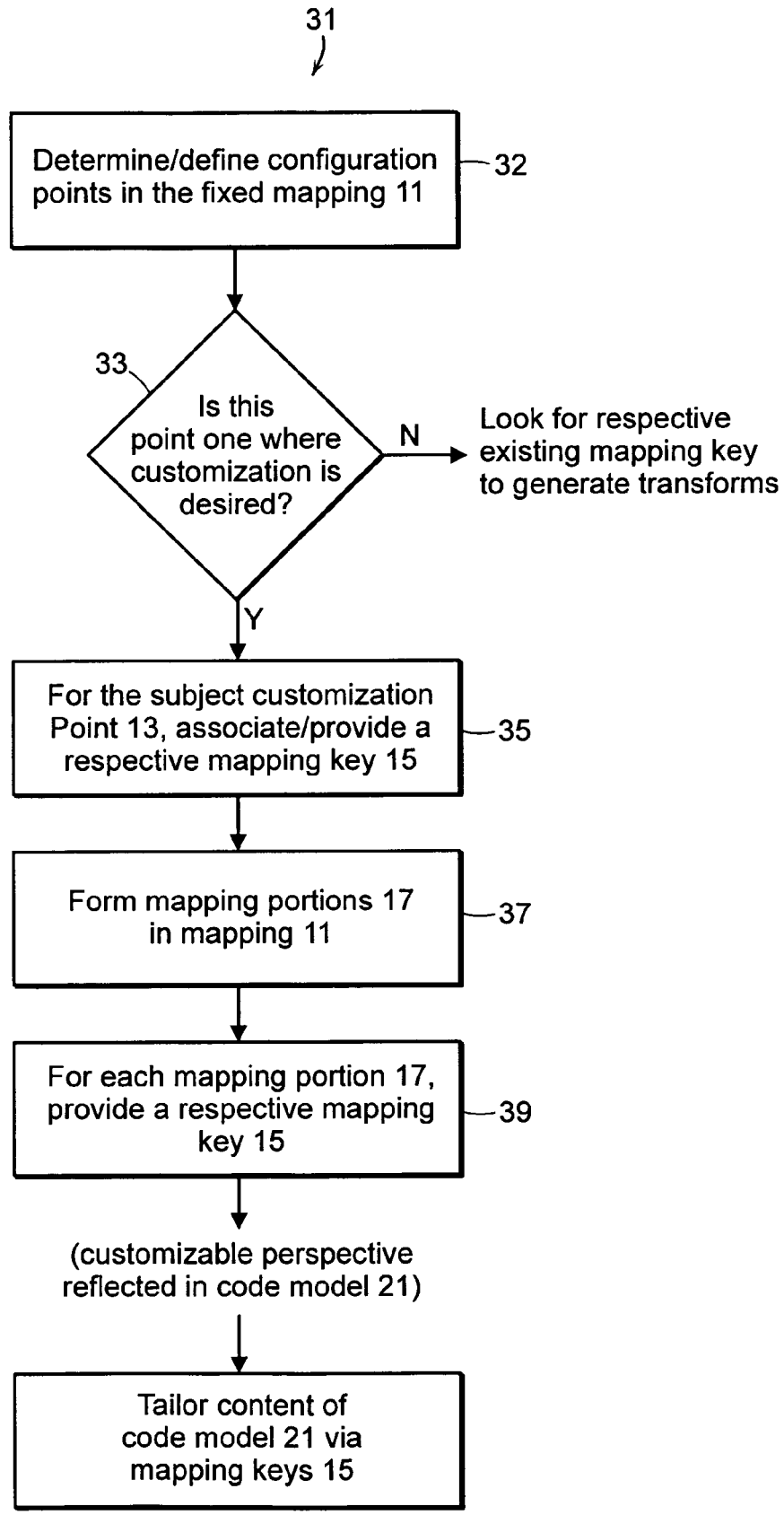
FIG. 2 is a flow diagram or diagram of method steps of a preferred embodiment.

Illustrated in FIG. 2 is a flow diagram of the present invention method 31 for customizing and thus extending a fixed mapping 11 between computer program code 19 and a code model 21. Given a fixed mapping 11 between a program code language 19 and a code model notation 21, the present invention method step 32 defines particular points in the mapping that can be customized and thus are points for extending the mapping. These customization points are known to require a larger degree of freedom in the mapping 11. As the invention considers the mapping of a particular point, the invention considers (e.g., defines, identifies and/or specifies) whether or not the point is one of the defined customization points (step 33).

Otherwise the point is a non-customization point and the predefined fixed mapping is employed to generate transformations between the corresponding code piece 19 and code-model piece 21.

In the next step 35, the present invention associates with or otherwise provides (couples, corresponds and the like) a respective mapping key 15 to the subject customization point 13. As part of this step, one or more distinct mapping portions 17 (step 37) are formed from the mapping 11 such that the mapping key 15 associated with the subject customization point 13 is applied to only certain code pieces 19 and certain corresponding model parts 21. Thus, for each mapping portion 17, the method (step 39) provides a respective mapping key 15 that (i) enables a piece of computer program code 19 in the mapping portion 17 to be derived from a corresponding piece of the code model 21, (ii) specifies the reverse transformation from code 19 to model 21 for the respective mapping portion 17, and (iii) employs formulas as described above.

These steps 31 (FIG. 2) result in a customizable perspective that the code model 21 reflects. In turn, this enables/allows content of the code model 21 to be tailored, for example, to elide implementation details.

The following is an example for customizing the mapping of UML AssociationEnd's to code using a mapping key.

```
Mapping Key:
Name = STL
AppliesTo = AssociationEnd
   Select Case
      Ordering is [Any]
      Kind is [Any]
      Cardinality is [Fixed,Bounded]
   Use
      {SupplierType}[{Upper_Limit}]
   EndCase
   Select Case
      Ordering is [UNORDERED]
      Cardinality is [Unbounded]
   Use
      stl::set<{SupplierType}>
   EndCase
   Select Case
      Ordering is not [UNORDERED]
      Cardinality is [Unbounded]
   Use
      std::list<{SupplierType}>
   EndCase
   Select Case
      Kind is [COMPOSITION]
      Cardinality is [One]
   Use
      {SupplierType}
   EndCase
   Select Case
      Kind is not [COMPOSITION]
      Cardinality is [One]
   Use
      {SupplierType} *
   EndCase
   Select Case
      Cardinality is [ZeroOrOne]
   Use
      {SupplierType} *
   EndCase
EndKey
```

The specific syntax above communicates the structure of a mapping key but is not in itself part of the invention. A mapping key 15 can be captured in other formats such as XML. However XML was not chosen here because it adds additional syntax which could obfuscate the structure to the reader.

A mapping key 15 pertains to a particular customization point 13. This customization point 13 defines the model 21 parameters and code 19 parameters which are being mapped by a mapping key 15. Model parameters determine which code-model elements and which of their properties are being mapped. Code parameters are placeholders for the pieces of text to be covered by the mapping key 15.

In many cases, the model properties are not the same as the underlying notation mandates. For example, UML's multiplicity may surface as {upper_limit}, {lower_limit}. To distinguish these constructs from properties defined in the code model they are called accessors. Accessors support a bi-directional transformation between code-model and code. Accessors can coincide with original properties (for example {property(Visibility)}) where it makes sense, but they remain special to the mapping mechanism.

A formula ("{type(stl::set)}<{SupplierType}>") containing accessors is the central vehicle to define a mapping. A formula consists of fixed parts which are to be found in code and accessors. In the example, syntax accessors appear in braces. At positions where the type(<fqname>)} accessor can be deduced, it can be dropped from the formula, as shown in the example. They are treated as accessor nonetheless and by definition will match different qualifications of the type.

The formula language is designed such that an algorithm can determine whether a piece of code matches a formula. In this event, the associated model properties will be determined based on the case. The case definition determines the value of the model properties based on the bound formula and/or explicit initial values. The formula syntax can vary based on the target code language and/or mapping point that is being customized.

It is central to the invention that a formula establishes a bi-directional transformation. This is achieved by limiting the expressiveness of the formula such that they become declarative.

To ensure that mapping keys 15 can be applied in complex situations, a mapping key 15 differentiates between different cases. When applying the mapping key 15 to a model element (or fragment) the case is selected by evaluating the case conditions. Any propositional language can be used to distinguish the cases for a mapping key 15. For mapping keys 15 that map several pieces of code 19, each case contains the corresponding number of formulas.

For simpler problems the definition of cases is not required and a mapping key 15 may specify a formula directly.

To simplify the case-selection language it is useful to expose criteria which categorize the mapping space appropriately. For example, instead of using UML's Multiplicity directly the criteria Cardinality is introduced that enumerates relevant cases with respect to code such as [One, ZeroOrOne, Fixed, Bounded, Unbounded]. In advanced implementations of the mechanism, users can define their own criteria. This should be done if fixed criteria are not sufficient. Restricting the case-selection language to operate on criteria enables the invention tool/method 31 to understand which cases can/should be covered. It is quite common to expose properties directly as criteria if they are enumerations.

Under the assumption that all available selection criteria are enumerations, a suitable language may provide the following capabilities:

Ordering is not [UNORDERED]
Kind is [SIMPLE, AGGREGATION]
Cardinality is [Fixed]

The condition is the logical conjunction (AND) of the lines and logical disjunction (OR) of the enumeration literals. Criteria which are not relevant can either be left out or included by writing Ordering is any A mapping key 15 is most useful if it is fully defined. In this event, it assigns exactly one case to each possible criteria combination. In addition, the properties associated with a case's formula must be consistent such that they will select the same case. In other words, the reverse transformation followed by a forward transformation will select the same case. To achieve this, each case should allow to specify initial model 21 values if they can't be derived from the accessor alone. This is not shown in the example.

A piece of code 19 can be matched against the applicable formulas. Each case for which a formula matches will become a candidate to determine the reverse transformation. In some usage scenarios, this ambiguity doesn't need to be resolved. In this event, the mechanism can provide a list of agreeable mapping keys 15 that applies to a situation. If a resolution is required, the resolution will usually be based on a precedence order. In addition, it is often useful to not change an associated mapping key 15 unless it becomes inconsistent with the code 19. The resolution mechanism is application dependent.

In general, mapping keys 15 should be defined such that for most cases no ambiguities arise. This is quite natural since one should assume that different cases will generate distinct code such that the formula's become distinctive too.

Finally the invention does not rely on the principal syntax shown above using Select Case etc. For example, a Select Otherwise case may be added to simplify usability. Also the mapping keys 15 can be persisted in any form including being a model itself. This would enable the mapping keys 15 to be managed in the same way as other modeling assets.

Figure 3:
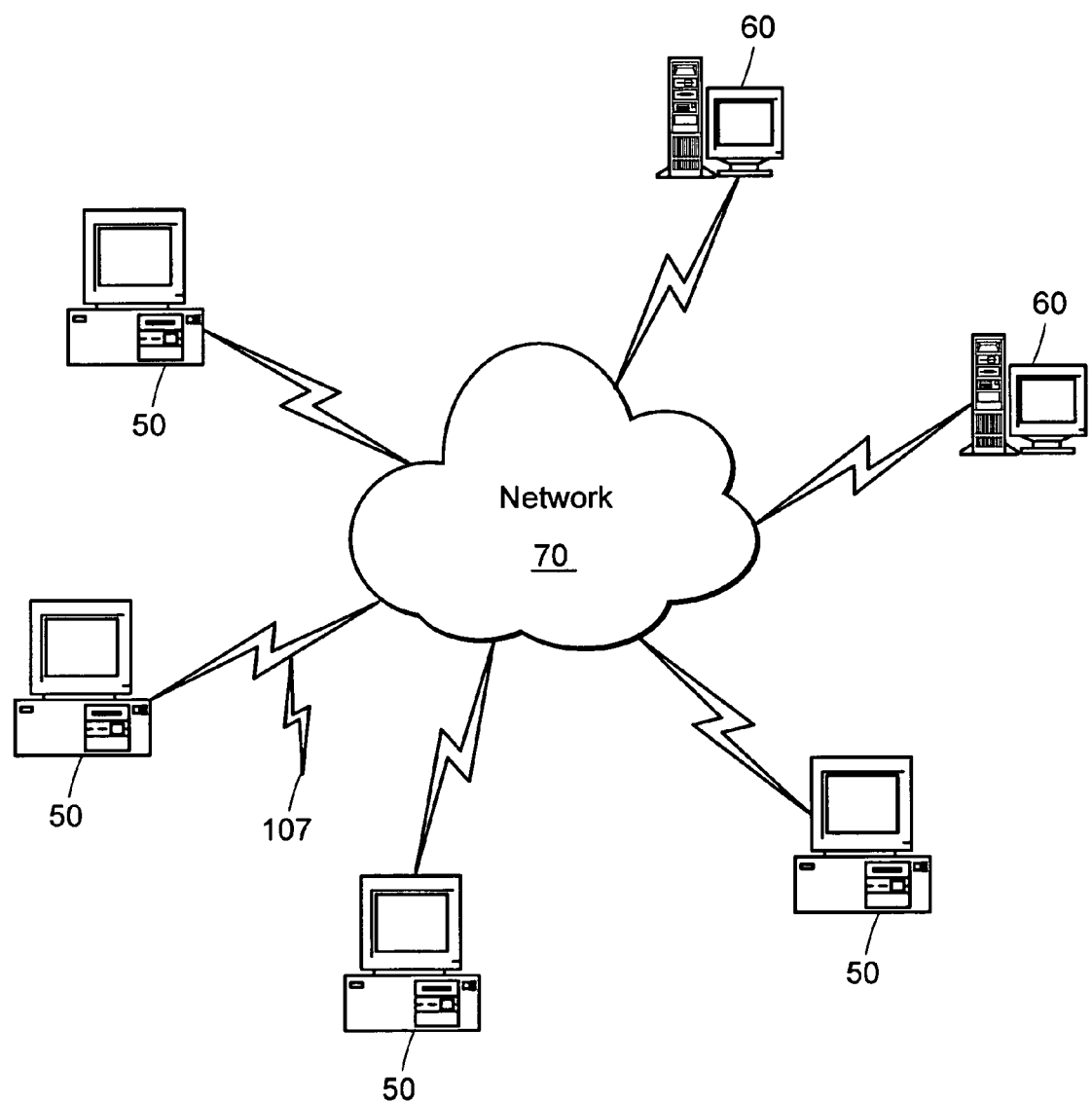
FIG. 3 is a schematic view of a computer environment in which the principles of the present invention may be implemented.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
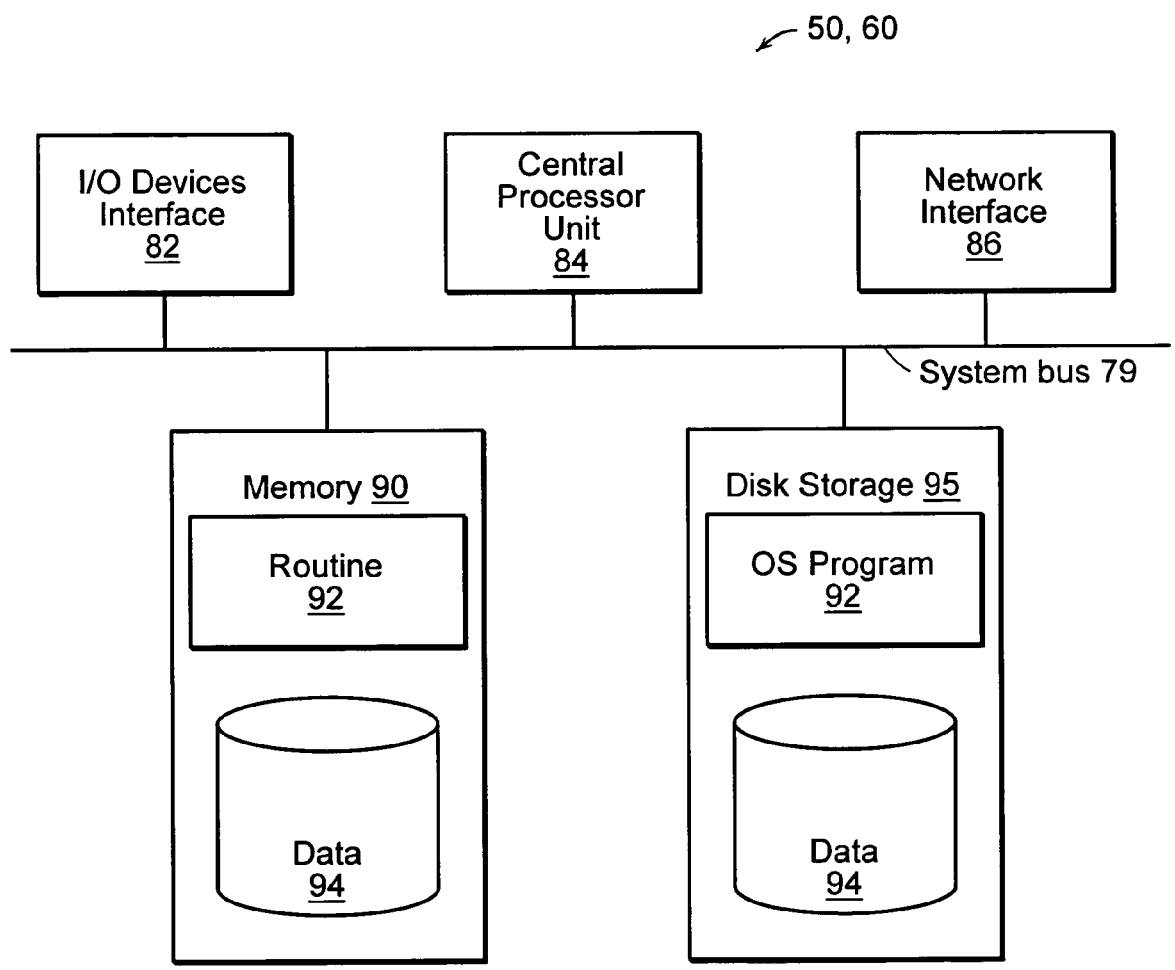
FIG. 4 is a block diagram of the internal structure of a computer from the FIG. 3 computer environment.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., subject fixed mapping, code and model 11, 19, 21, mapping keys 15, method instructions 31 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

It is noted that the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for customizing a fixed mapping between a computer program code and a code-model, comprising the steps of:
   in a computer processor, given a fixed mapping between (a) a computer program code expressed in a certain programming language and (b) a code-model expressed in a modeling language extending the fixed mapping by defining one or more customization points in the mapping; and
   for each customization point, using the computer processor and associating a respective mapping key with the customization point, there being different mapping keys for different customization points, the mapping keys enabling at least one of (i) certain pieces of the computer program code to be derived from corresponding pieces of the code model in the modeling language notation, and (ii) certain pieces of the code-model in the modeling language notation to be derived from corresponding pieces of the computer program code, wherein in the computer processor, each mapping key specifies both a forward transformation and a reverse transformation between the computer program code and the code-model in the modeling language notation, such that a same mapping key is useable to specify the reverse transform,
   during mapping a subject point in the computer program code to the code-model, determining whether the subject point is one of the defined customization points, if the subject point is one of the customization points then applying the respective associated mapping key to only certain code pieces and certain corresponding pieces of the code-model, otherwise treating the subject points as a non-customization point and applying the fixed mapping as given before the extending.

2. A method as claimed in claim 1 wherein the step of associating a respective mapping key with the customization point includes:
   using the defined customization points, forming from the mapping a set of distinct mapping portions; and
   for each mapping portion, providing a respective mapping key that enables at least one of (i) a piece of the computer program code in the mapping portion to be derived from a corresponding piece of the code model and (ii) a piece of the code-model in the mapping portion to be derived from a corresponding piece of the computer program code.

3. A method as claimed in claim 1 wherein the mapping keys employ (i) formulas representing patterns identified in the computer program code in the respective mapping portion, and (ii) matching formulas identifying a reverse transformation from the computer program code to the code-model.

4. A method as claimed in claim 1 wherein the customization points are formed from predefinable points in the fixed mapping.

5. A method as claimed in claim 1 further comprising:
   reflecting a customizable perspective in the code-model; and
   tailoring content of the code-model.

6. A method as claimed in claim 5 wherein tailoring includes eliding implementation details in the code model.

7. Computer apparatus for customizing a fixed mapping between computer program code and code-model, comprising:
   a computer processor having a fixed mapping between a computer program code and a code-model; and
   one or more mapping keys extending the fixed mapping by defining respective customization points in the fixed mapping, the customization points being formed from predefinable points in the fixed mapping, there being a respective mapping key for each customization point, each mapping key being associated with the customization point in a manner that forms from the fixed mapping a set of distinct mapping portions, for each mapping portion the respective mapping key enabling at least one of (i) a certain piece of the computer program code in the mapping portion to be derived from a corresponding piece of the code-model expressed in a modeling language notation, and (ii) a certain piece of the code model in the mapping portion to be derived from a corresponding piece of the computer program code, wherein each mapping key specifies to the computer processor both a forward transformation and a reverse transformation between the computer program code and the code model in the modeling language notation, such that a same mapping key is useable to specify the reverse transform,
   wherein the computer processor during mapping of a subject point in the computer program code to the code-model, determines whether the subject point is one of the defined customization points, if the subject point is one of the customization points then applying the respective associated mapping key to only certain code pieces and certain corresponding pieces of the code-model, otherwise treating the subject point as a non customization point and applying the fixed mapping as given before the extending.

8. Computer apparatus as claimed in claim 7 wherein the mapping keys employ (i) formulas representing patterns identified in the computer program code in the respective mapping portion, and (ii) matching formulas identifying a reverse transformation from the computer program code to the code-model.

9. Computer apparatus as claimed in claim 7 wherein the code-model reflects a customizable perspective and the apparatus tailors content of the code-model.

10. Computer apparatus as claimed in claim 9 wherein tailored content of the code-model includes elided implementation details.

11. Computer apparatus for extending a fixed mapping between computer program code and code-model, comprising
   a computer processor having a fixed mapping between a computer program code language and a code-model notation; and
   one or more mapping keys extending the fixed mapping by defining respective customization points in the fixed mapping, the customization points being formed from predefined points in the fixed mapping, there being a respective mapping key for each customization point, the mapping keys coupled to the computer processor and enabling at least one of (i) certain pieces of the computer program code to be derived from corresponding pieces of the code-model, and (ii) certain pieces of the code-model to be derived from corresponding pieces of the computer program code wherein each mapping key specifies both a forward transformation and a reverse transformation between the computer program code and the code model notation, such that a same mapping key is useable to specify the reverse transform, wherein the computer processor during mapping of a subject point in the computer program code to the code-model, determines whether the subject point is one of the defined customization points, if the subject point is one of the customization points then applying the respective associated mapping key to only certain code pieces and certain corresponding pieces of the code-model, otherwise treating the subject point as a non customization point and applying the fixed mapping as given before the extending.

12. Computer apparatus as claimed in claim 11 wherein each mapping key is associated with the respective customization point in a manner that effectively forms from the fixed mapping a set of distinct mapping portions, for each mapping portion the respective mapping key enabling at least one of (i) a piece of the computer program code in the mapping portion to be derived from a corresponding piece of the code-model, and (ii) a piece of the code model in the mapping portion to be derived from a corresponding piece of the computer program code.

13. A computer system for customizing and/or extending a fixed mapping between computer program code and code-model, comprising:

a mapping means having a fixed mapping between a computer program code and code-model, the mapping means extending the fixed mapping by defining one or more customization points in the fixed mapping; and a computer processor having, for each customization point, mapping key means for enabling at least one of (i) a certain piece of computer program code to be derived from a corresponding piece of code-model, and (ii) a certain piece of code-model to be derived from a corresponding piece of computer program code, wherein in the computer processor, each mapping key specifies both a forward transformation and a reverse transformation between the computer program code and the code-model such that a same mapping key is useable to specify the reverse transform, and wherein the computer processor during mapping of a subject point in the computer program code to the code-model determines whether the subject point is one of the defined customization points, if the subject point is one of the customization points then applying the respective associated mapping key to only certain code pieces and certain corresponding pieces of the code-model.

14. A computer system as claimed in claim 13 wherein the means for defining and the mapping key means effectively form from the fixed mapping a set of distinct mapping portions, for each mapping portion the mapping key means enabling at least one of (i) a piece of the computer program code in the mapping portion to be derived from a corresponding piece of the code-model, and (ii) a piece of the code-model in the mapping portion to be derived from a corresponding piece of the computer program code.

15. A computer system as claimed in claim 13 wherein the mapping means form customization points from predefinable points in the fixed mapping such that the mapping means effectively extends the fixed mapping.

16. A computer program product comprising a computer readable storage medium, carrying computer readable code for controlling a digital processor to customize and/or extend fixed code-to-model mappings by carrying out the steps of:

given a fixed mapping between (a) a computer program code expressed in a certain programming language and (b) a code-model expressed in a modeling language notation, extending the fixed mapping by defining customization points in the mapping; and for each customization point, associating a respective mapping key with the customization point, there being different mapping keys for different customization points, the mapping keys enabling at least one of (i) certain pieces of the computer program code to be derived from corresponding pieces of the code model, and (ii) certain pieces of the code-model to be derived from corresponding pieces of the computer program code, wherein each mapping key specifies both a forward transformation and a reverse transformation between the computer program code and the code-model in the modeling language notation, such that a same mapping key is useable to specify the reverse transform, during mapping a subject point in the computer program code to the code-model, determining whether the subject point is one of the defined customization points, if the subject point is one of the customization points then applying the respective associated mapping key to only certain code pieces and certain corresponding pieces of the code-model, otherwise treating the subject point as a non-customization point and applying the fixed mapping as given before the extending.

17. A computer program product as claimed in claim 16 wherein the step of associating a respective mapping key with the customization point includes:

using the defined customization points, forming from the mapping a set of distinct mapping portions; and for each mapping portion, providing a respective mapping key that enables at least one of (i) a piece of the computer program code in the mapping portion to be derived from a corresponding piece of the code model, and (ii) a piece of the code-model in the mapping portion to be derived from a corresponding piece of the computer program code.

18. A computer program product as claimed in claim 16 wherein the step of defining customization points includes using predefinable points in the fixed mapping to form customization points and effectively extend the fixed mapping.

* * * * *